Jan. 29, 1946.　　　J. SKUHROVEC　　　2,393,662
CONTROL SYSTEM FOR WELDING HEADS
Filed Dec. 13, 1943　　　2 Sheets-Sheet 1

INVENTOR.
Joseph Skuhrovec
BY
Evans + McCoy
ATTORNEYS

Jan. 29, 1946.   J. SKUHROVEC   2,393,662
CONTROL SYSTEM FOR WELDING HEADS
Filed Dec. 13, 1943   2 Sheets-Sheet 2

INVENTOR.
Joseph Skuhrovec
BY
Evans + McCoy
ATTORNEYS

Patented Jan. 29, 1946

2,393,662

UNITED STATES PATENT OFFICE 2,393,662

CONTROL SYSTEM FOR WELDING HEADS

Joseph Skuhrovec, Cleveland, Ohio, assignor to Una Welding, Inc., Cleveland, Ohio, a corporation of Ohio Application December 13, 1943, Serial No. 514,092

8 Claims. (Cl. 314—62)

This invention relates to an electrode operating mechanism for welding heads and more particularly to an electrical control for the electrode operating motors.

The present invention provides an improved motor control for welding heads of the type in which the electrode is actuated by two simultaneously operating motors that are geared to the electrode feed mechanism through a suitable differential so as to impart to the feed mechanism a movement that is the resultant of the speeds of the two motors.

The present invention has for its object to provide a control for the electrode operating motors in which the speed of one of the motors is so controlled by the voltage across the arc as to eliminate jerky movements of the electrode during its movements toward and away from the work in striking the arc and during the welding operation.

More specifically it is the object of the present invention to provide a control of the character described that acts through a field winding of a shunt wound motor to vary the speed of the motor and to so stabilize or dampen the electromagnetic forces as to prevent sudden fluctuations in speed that would impart jerky movements to the electrode.

With the above and other objects in view the invention may be said to comprise the electrode operating mechanism as shown in the accompanying drawings hereinafter described and particularly set forth in the appended claims together with such variations and modifications thereof as will be apparent to one skilled in the art to which the invention pertains.

Reference should be had to the accompanying drawings in which.

Figure 1:
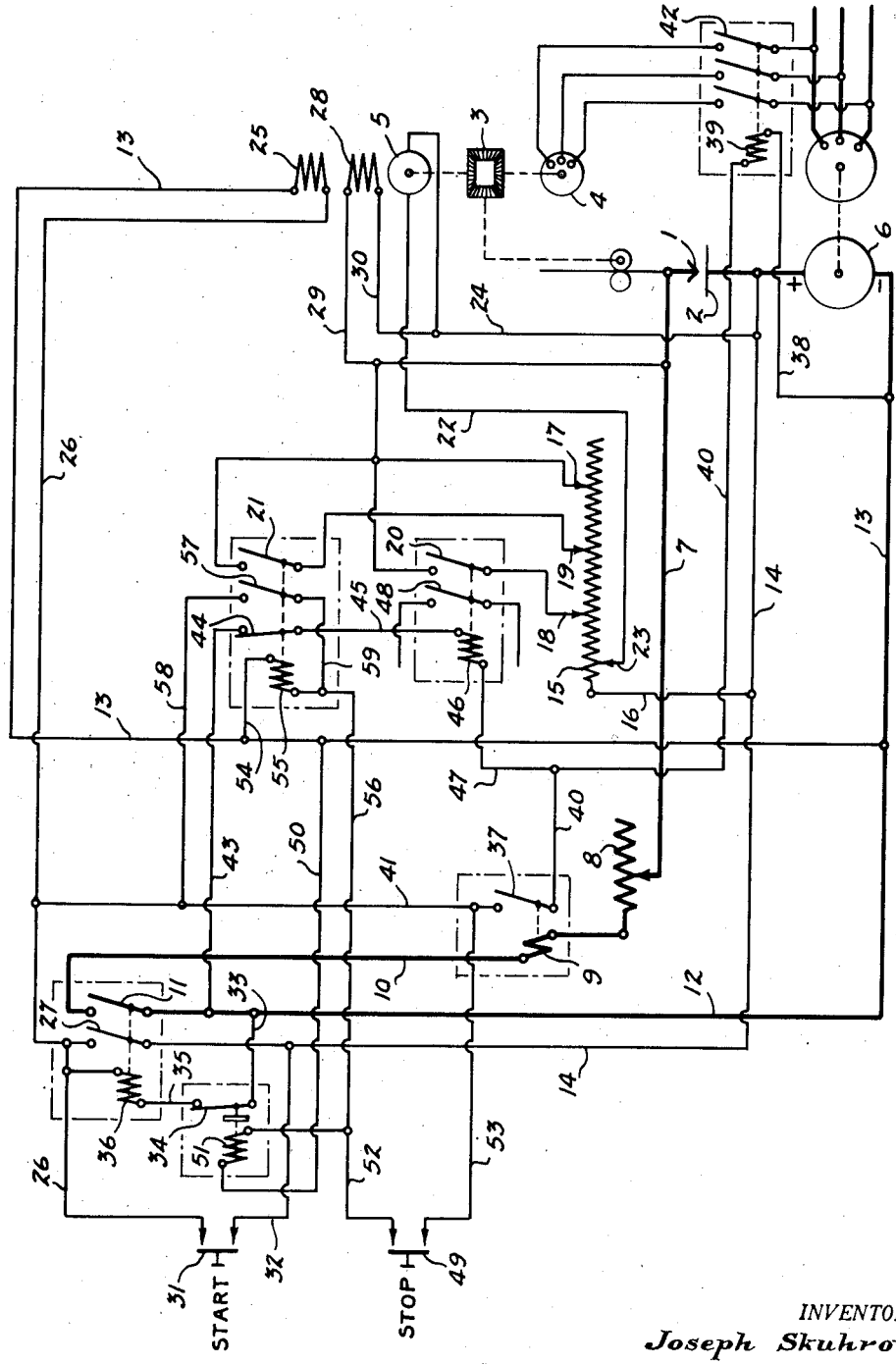
Fig. 1 is a wiring diagram showing the invention applied to a welding head that is provided with a constant potential welding generator.

In welding machines of the type to which the present invention is applied an electrode 1 is moved toward and away from a work piece 2 by a suitable feed mechanism driven through a differential gearing 3 by two electric motors 4 and 5. The two motors drive the axially alined shafts of the differential 3 and the electrode 1 is actuated by the ring gear at a speed that is the resultant of the speeds of the two motors. The motor 4 is a motor of constant speed characteristics and may be either an A. C. or D. C. motor. The motor 5 is a D. C. shunt wound motor having a normal speed of rotation somewhat higher than the motor 4. The motor 4 rotates in a direction to elevate the electrode and may be termed the "up" motor. The motor 5 rotates in a direction to lower the electrode toward the work and may be called the "down" motor. The motors are controlled during operation to move the electrode to strike an arc and to automatically maintain an arc of a predetermined length.

In the embodiment of the invention shown in Fig. 1 current for welding and for operation of the down motor 5 is supplied by a constant potential welding generator 6. The welding electrode 1 is adapted to receive current from one terminal of the generator 6 through a wire 7 an adjustable resistance 8 a series relay 9 a wire 10 a switch 11 and wires 12 and 13. The series relay 9 is designed to actuate its armature only upon passage of a predetermined current therethrough and the resistance 8 may be adjusted to regulate amount of current that is delivered to the welding circuit. The work 2 is connected to the opposite terminal of the generator 6 through a wire 14. An arc regulating resistance 15 in parallel with the arc is connected by a wire 16 to the wire 14 and through one or more of the adjustable contacts 17, 18 and 19 to the wire 7, contact 17 being connected directly to the wire 7. The contact 18 may be connected to the wire 7 through a switch 20 and the contact 19 may be connected to the wire 7 through a switch 21.

The down motor 5 has one terminal of its armature connected by a wire 22 to an adjustable contact 23 engaging the resistance 15 and its opposite terminal connected through a wire 24 to the wire 14. A circuit is thus provided from one terminal of the generator 6 through wires 13 and 12, the switch 11, the wire 10, the coil 9, the resistance 8, the wire 7, the resistance 15, the contact 23, the wire 22, the armature of motor 5 and the wires 24 and 14 to the opposite terminal of the generator. During operation of the machine the switch 20 is operated to cut out a major portion of the resistance 15 to speed up the down motor 5 and the switch 21 is operated while the machine is being stopped to cut back a portion of the resistance and slow down the motor 5.

The down motor 5 has a main shunt field winding 25 that has one terminal connected to a terminal of the generator 6 through the wire 13 and its opposite terminal is adapted to be connected through a wire 26, a switch 27 and the wire 14 to the opposite terminal of the generator.

The down motor 5 has an auxiliary shunt field winding 28 that is connected across the arc, one terminal being connected by a wire 29 and wire 7 to the electrode 1 and the other terminal being connected by wires 30, 24 and 14 to the work 2.

Figure 2:
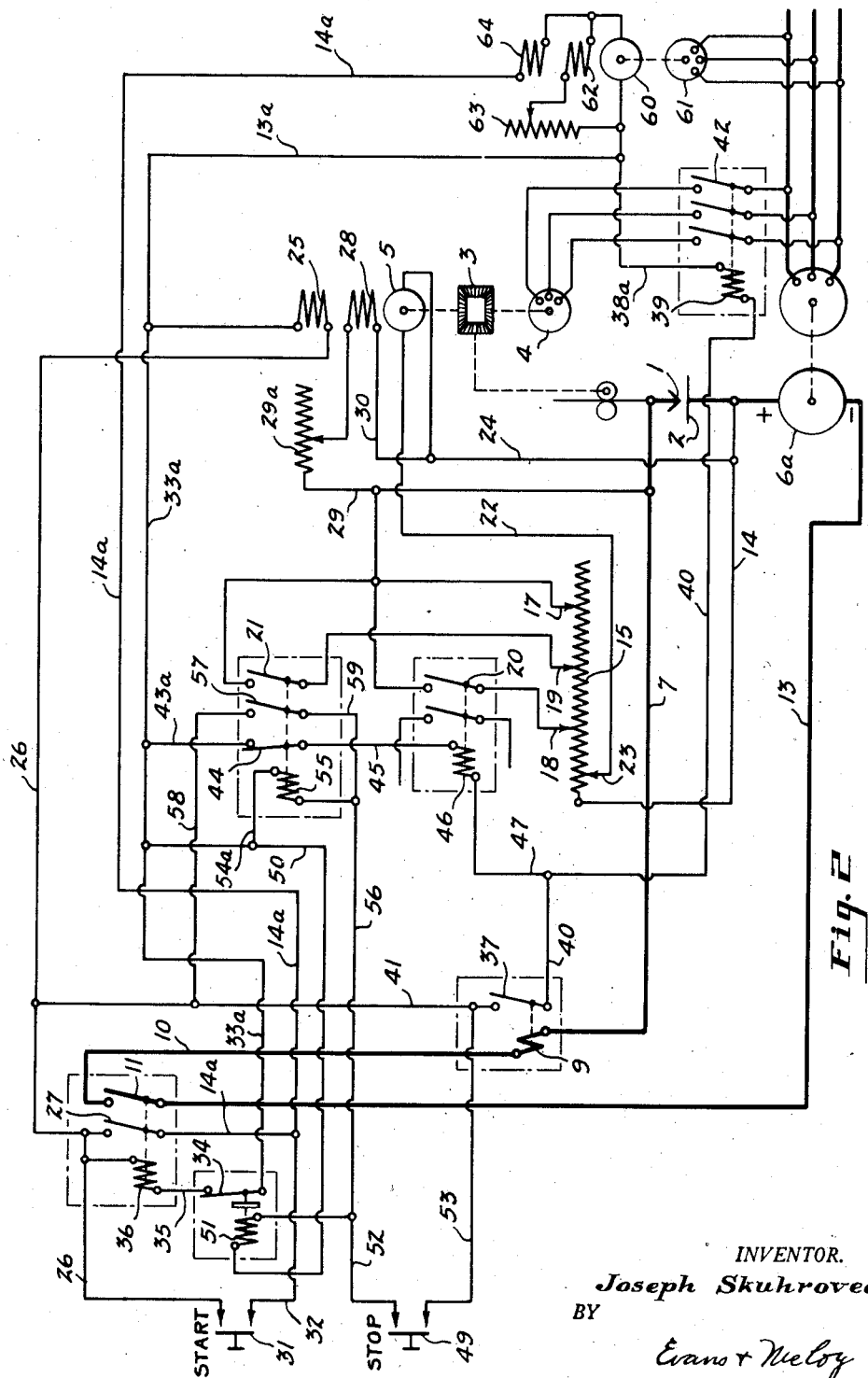
Fig. 2 is a wiring diagram showing the invention applied to a welding head that has a variable voltage generator.

The amount of current supplied to the winding 28 may be regulated, if desired, by a suitable adjustable resistance in series with the winding, such as the adjustable resistance 29ª shown in Fig. 2.

The generator circuits are so controlled that upon initial energization the down motor 5 is first operated to move the electrode 1 toward the work 2 to strike an arc after which the up motor 4 is started into operation to reverse the movement of the electrode, after which the speed of the motor 5 is increased to again reverse the movement of the electrode and to maintain a uniform arc.

A starting switch 31 which may be of the push button type, has one contact connected to the wire 26 and its other contact connected by a wire 32 to the wire 14. When the starting switch 31 is closed a circuit is completed from one terminal of the generator 6 through the wires 13 and 12, a wire 33, a normally closed switch 34, a wire 35, a solenoid 36, the wire 26, the switch 31 and the wires 32 and 14 to the opposite terminal of the generator 6. Since the motor winding 25 is in parallel with the coil 36 between the wires 13 and 14 a portion of the current will flow through the winding 25. Current flowing through the solenoid 36 energizes the same and closes the switches 11 and 27.

The switch 27 when closed completes a circuit from one terminal of the generator 6 through the wire 13, the winding 25, and wires 26 and 14 and also a holding circuit through the wires 13, 12 and 33, the switch 34, the wire 35, the solenoid 36, the wire 26 and the wire 14 to the opposite terminal of the generator.

Closing of the switch 11 completes a circuit from one terminal of the generator 6 through the wires 13 and 12, the switch 11, the wire 16, the series relay coil 9, the resistance 8, the wire 7, the regulating resistance 15, the wire 22, the armature of the motor 5 and wires 24 and 14 to the opposite terminal of the generator 6.

Since the motor winding 28 is connected in parallel with the resistance 15 across the arc current will also flow through wires 7 and 29, winding 28 and wires 30, 24 and 14 to generator 6.

Current flowing through the armature of the motor 5 and through the shunt windings thereof upon the closing of switches 11 and 27 starts the down motor 5 into operation to feed the electrode in a downward direction. Initially there is a relatively light current passing through the series relay 9 due to the fact that this coil is in parallel with the coil 36 and winding 25 and in series with a relatively high resistance when the electrode 1 is spaced from the work 2. The relay 9 actuates a normally open switch 37 but is so designed that it imparts movement to the switch only when a predetermined current passes through it. When the electrode 1 approaches and contacts the work 2 the coil 15 winding 28 and the armature of the motor 5 are short circuited stopping or greatly reducing the speed of the down motor 5. The short circuiting of the resistance 15 causes a surge of current through the coil 9 which energizes the coil and closes the switch 37.

Closing the switch 37 completes a circuit from one terminal of the generator 6 through the wires 13 and 38, a solenoid 39, a wire 40, the switch 37, a wire 41, the wire 26, the switch 27, and the wire 14 to the opposite terminal of the generator. The solenoid 39 when energized closes a switch 42 that starts the up motor 4 and reverses the direction of movement of the electrode.

In order to check and limit the upward movement of the electrode it is necessary to quickly accelerate the down motor 5 to a speed somewhat greater than that of the up motor 4 to arrest the upward movement of the electrode 1 and to start a uniform downward feed movement at a rate to compensate for electrode metal consumed by the arc. To effect a suitable adjustment of the down motor control circuits to effect this speed up the switch 37 completes a second circuit from one terminal of the generator 6, the wires 13 and 12, a wire 43, a normally closed switch 44, a wire 45, a solenoid 46, a wire 47, the wire 40, the switch 37, the wires 41 and 26, the switch 27 and the wire 14 to the opposite terminal of the generator 6. Energization of the solenoid 46 closes the switch 28 and short circuits the major portion of the regulating resistance 15 so that the current through the armature and shunt winding 28 of the down motor 5 is considerably increased.

Energization of the series relay 9 starts the welding operation, and may also start the movement of parts of the machine other than the electrode. The solenoid 46 controlled by the relay 9 may operate a second switch 48 in an independent circuit which may control the usual work feed mechanism.

During operation, the circuits controlling the motor 5 are automatically responsive to variations in the voltage across the arc to automatically vary the speed of the motor to maintain a uniform arc. Because of the fact that both the main and auxiliary windings are shunt windings and because of the fact that the auxiliary winding is connected across the arc, the control circuits are stabilized or dampened sufficiently to prevent objectionably rapid acceleration or deceleration of the down motor 5 due to fluctuations of voltage across the arc during operation. The control of the down motor provided by the present invention prevents overspeeding due to the initial high voltage momentarily impressed upon the down motor during the arc starting period.

The system is deenergized by means of a stop switch 49 which may be of the push button type and which, when closed, completes a circuit from one terminal of the generator 6, through the wires 13 and 50, a time delay relay 51, a wire 52, the switch 49, a wire 53, the wires 41 and 26, the switch 27 and the wire 14 to the opposite terminal of the generator 6. Energization of the delay relay 51 opens the switch 34 after a predetermined short time interval, breaking the holding circuit through the solenoid 36 and permitting switches 11 and 27 to open. The opening of the switches 11 and 27 opens the down motor and welding circuits, deenergizing the series relay 9 and allowing the switch 37 to open. Opening of the switch 37 deenergizes the solenoid 39, breaking the circuit of the up motor 4.

Closing the switch 49 also closes a circuit from one terminal of the generator 6 through the wire 13, a wire 54, a solenoid 55, a wire 56, the wire 52, the switch 49, the wires 53, 41, and 26, the switch 27 and the wire 14 to the opposite terminal of the generator 6.

Energization of the solenoid 55 closes the switch 21 to connect the intermediate contact 19 to the wire 7. Energization of the solenoid 55 also opens the normally closed switch 44 to deenergize the solenoid 46 before the circuit though the coil 9 is broken opening the switch 20 so that a greater portion of the resistance 15 is cut into the armature circuit through the contact 19 and switch 21 to decelerate the down motor during the short time interval elapsing between the closing of the stop switch 49 and the breaking of the welding and motor control circuits by the opening of the switches 11 and 27.

To insure the continued energization of the solenoid 55 during the time interval between the closing of the stop switch 49 and the opening of the operating circuits, the solenoid 55 actuates a holding switch 57 connected in parallel with the stop switch 49 by means of a wire 58 connecting one terminal of the switch 57 to the wire 41 and a wire 59 connecting the other terminal thereof to the wire 56. The deceleration of the down motor 5 during the time interval provided by the delay relay 51 causes the electrode 1 to be retracted from the work when the machine is stopped. The extent of movement of the electrode away from the work may be limited by suitable means and, if desired, the motors 4 and 5 may be equipped with suitable automatically controlled brakes to limit the coasting thereof after deenergization as is well understood in the art.

The invention may be applied to a welding machine having a variable voltage generator by employing a D. C. motor generator set for supplying current to the main shunt winding of the down motor 5 as shown in Fig. 2. The same control relays solenoids and switches are employed as in Fig. 1 and these parts are designated by the same reference numerals as in Fig. 1. The welding generator 6a is connected through the wire 14 to the work 2 and through the wire 13, the switch 11, wire 10 and series relay 9 to the electrode. The resistance 8 shown in Fig. 1 is not necessary because all of the current from the generator 6a passes through the series relay 9. The armature and the auxiliary shunt winding 28 of the down motor 5 are connected across the arc in the same way as in Fig. 1, the resistance 28a which may be placed in series with the winding 28 being shown in this view. The D. C. motor generator set has a generator 60 driven by a motor 61. The generator 60 has a shunt field 62, a regulating resistance 63 and a series field 64. The opposite terminals of the generator 60 are connected to wires 13a and 14a to which all of the energizing relays and solenoids except the series relay 9 are connected, the wires of the control circuits other than the welding circuits and the down motor circuits associated therewith being connected to the wires 13a and 14a in the same manner as they were connected to the wires 13 and 14 in Fig. 1.

For convenience of illustration some of the wires in Fig. 2 are arranged somewhat differently. Such wires are indicated by the same reference numerals as in Fig. 1 with the addition of the letter "a," e. g., 33a, 38a, 43a and 54a.

The starting circuit is from generator 60 through wires 13a, 33a, switch 34, wire 35, solenoids 36, wire 26, push button switch 31, and wires 32 and 14a to generator. For the holding circuit switch 27 connects the wire 26 to wire 14a in parallel with switch 31 and wire 32.

The shunt winding 25 is connected to the wire 13a and through wires 26 and switch 27 to the wire 14a, being in parallel with solenoid 36.

The circuit through the up motor control solenoid 39 completed by closing the switch 37 is from generator 60 through wires 13a and 38a, the solenoid 39, the wire 40, the switch 37, wires 41 and 26, switch 27 and wire 14a to the generator 60.

The circuit through the speed control and work feed control solenoid 46 completed by closing the switch 37 is from generator 60 through wires 13a, 33a, 43a, the normally closed switch 44, the wire 45, the solenoid 46, wires 47 and 40, switch 37, wires 41, 26, the switch 27, and the wire 14a to the generator 60.

The stop push button 49 closes circuits through the time relay 51 and the solenoid 55. The relay 51 is connected to wire 13a by wires 50 and 33a and and to the wire 14a through wire 52, switch 49, wires 53, 41, and 26, and the switch 27. The solenoid 55 is connected to the wire 13a by wires 54a and 33a and to the wire 14a through wires 56 and 52, the switch 49, wires 53, 41 and 26 and the switch 27.

The solenoid 55 closes a holding switch 57 that provides a connection from the relay 51 to the wire 14a through wires 52, 56 and 59, switch 57, wires 58, 41 and 26 and the switch 27, and a connection from the solenoid 55 to the wire 14a through wires 56 and 59, the switch 57, wires 58, 41 and 26 and the switch 27.

It is to be understood that the embodiments of the invention herein shown are illustrative only and that many variations in detail thereof may be resorted to without departing from the invention herein claimed.

What I claim is:

1. In a welding machine having a work support and an electrode movable toward and away from the work by a feed mechanism driven through a differential, two drivers operating said differential, one of said drivers being a shunt wound motor having a main field winding and an auxiliary field winding connected to aid and strengthen the magnetic field of the main winding, said auxiliary winding being connected directly across the arc.

2. In a welding machine having a work support and an electrode movable toward and away from the work by a feed mechanism driven through a differential, two drivers operating said differential, one of said drivers being a shunt wound motor having its armature and a field winding connected across the arc, a resistance in series with the armature, and means controlled by the current in the welding circuit for varying said resistance.

3. In a welding machine having a work support and an electrode movable toward and away from the work by a feed mechanism driven through a differential, two drivers operating said differential, one of said drivers being a shunt wound motor having a field winding connected across the arc, and means controlled by the current passing through the electrode for varying the ratio of the current through said field winding to the current through the armature of said motor.

4. In a welding machine having a work support and an electrode movable toward and away from the work by a feed mechanism driven through a differential, two drivers operating said differential, one of said drivers being a shunt wound motor with two independent and separate field windings and having its armature and one of its field windings connected across the arc, a resistance in series with the armature, and a resistance of predetermined value in series with said winding, the second field winding being connected to a separate and independent source of constant potential.

5. In a welding machine having a work support and an electrode movable toward and away from the work by a feed mechanism driven through a differential, an up motor having a driving connection to said differential, a shunt wound down motor having a driving connection to said differential and having its armature and a field winding connected across the arc, and a resistance parallel with the armature and of a value such as to exert a dynamic braking effect.

6. In a welding machine, a work support, an electrode movable toward and away from the work, an electrode actuating mechanism comprising a differential and up and down motors driving said differential, one of said motors being a shunt wound motor having a plurality of field windings, the armature of the shunt wound motor and one of its windings being connected across the arc and means controlled by the current passing through the welding circuit for varying the resistance of the armature circuit.

7. In a welding machine, a work support, an electrode movable toward and away from the work, an electrode actuating mechanism comprising a differential and up and down motors driving said differential, one of said motors being a shunt wound motor having a plurality of field windings, the armature and windings of said shunt wound motor being in parallel with the arc, an adjustable resistance in series with the electrode and with the armature and one of said windings, a second variable resistance in series with the armature, and means controlled by the current passing through the electrode for increasing or decreasing said variable resistance.

8. In a welding machine, a work support, an electrode movable toward and away from the work, an electrode actuating mechanism comprising a differential and up and down motors driving said differential, one of said motors being a shunt wound motor having a plurality of field windings, the armature and windings of said shunt wound motor being in parallel with the arc, an adjustable resistance in series with the electrode and with the armature and one of said windings, a second variable resistance in series with the armature, a second adjustable resistance in series with the last mentioned winding, and means controlled by the current passing through the electrode for increasing or decreasing said variable resistance.

JOSEPH SKUHROVEC.